US006634269B2

(12) United States Patent
Eckstein et al.

(10) Patent No.: US 6,634,269 B2
(45) Date of Patent: Oct. 21, 2003

(54) APPARATUS AND METHOD FOR ASSOCIATING CUT SHEET SECTIONS WITH A MOVING CARRIER WEB

(75) Inventors: Joseph A. Eckstein, Sunman, IN (US); John F. Droste, Cincinnati, OH (US)

(73) Assignee: The Procter & Gamble Company, Cincinnati, OH (US)

(*) Notice: Subject to any disclaimer, the term of this patent is extended or adjusted under 35 U.S.C. 154(b) by 96 days.

(21) Appl. No.: 09/808,766

(22) Filed: Mar. 15, 2001

(65) Prior Publication Data

US 2002/0129687 A1 Sep. 19, 2002

(51) Int. Cl.[7] ............................ B26D 7/06; B23D 25/12

(52) U.S. Cl. ............................ 83/100; 83/152; 83/343; 83/346

(58) Field of Search .............................. 83/56, 98, 100, 83/346, 343, 152; 101/384.1, 216–249; 400/621; 346/138

(56) References Cited

U.S. PATENT DOCUMENTS 3,903,768 A * 9/1975 Amberg et al. ............. 226/108
4,009,814 A 3/1977 Singh
4,364,787 A 12/1982 Radzins
4,798,353 A 1/1989 Peugh
4,925,520 A 5/1990 Beaudoin et al.
5,306,384 A * 4/1994 Stutt .......................... 156/205
5,407,507 A 4/1995 Ball
5,545,285 A 8/1996 Johnson
5,570,620 A * 11/1996 Okonski et al. .............. 83/152
5,575,187 A * 11/1996 Dieterlen ............... 137/625.21
5,660,657 A 8/1997 Rajala et al.
5,693,165 A 12/1997 Schmitz
5,759,340 A 6/1998 Boothe et al.
5,782,156 A * 7/1998 Collins .................... 101/415.1
5,906,602 A 5/1999 Weber et al.
6,022,443 A 2/2000 Rajala et al.
6,026,725 A * 2/2000 Okonski ...................... 83/100
6,043,836 A * 3/2000 Kerr et al. ............... 101/389.1
6,059,710 A 5/2000 Rajala et al.
6,350,223 B1 * 2/2002 Niedermeyer ............... 493/357

* cited by examiner

*Primary Examiner*—Allan N. Shoap
*Assistant Examiner*—Isaac N. Hamilton
(74) *Attorney, Agent, or Firm*—Jack L. Oney, Jr.; Michael S. Kolodesh; Ken K. Patel

(57) ABSTRACT

Apparatus and a method for providing cut pieces from a first moving web and associating the cut pieces with a second, faster-moving carrier web. A vacuum roll is provided and cooperates with an adjacent cutter roll to enable transverse cuts to be made in the first web material. A vacuum manifold is provided and contacts the end wall surface of the vacuum roll to provide vacuum to apertures provided in the outer periphery of the vacuum roll. The vacuum roll and the vacuum manifold have spiral-like ports and slots to provide communication between a source of vacuum and the periphery of the vacuum roll at predetermined points in the path of rotation of the vacuum roll. The point of application of the vacuum to the leading edge of the first web is shifted rearwardly over the peripheral surface of the vacuum roll to correspond substantially with the slower rectilinear speed of the first web material, and thereby avoid the imposition of excessive tension to the first web material so that it is not permanently elongated before it is applied to the carrier web.

14 Claims, 12 Drawing Sheets

APPARATUS AND METHOD FOR ASSOCIATING CUT SHEET SECTIONS WITH A MOVING CARRIER WEB

BACKGROUND OF THE INVENTION

This invention relates to receiving and rotating strips of material and placing the rotated strips in surface contact with a continuously moving web.

1. Field of the Invention

The present invention relates to apparatus and to a method for handling materials in web form by cutting pieces from a slowly-moving first web and placing the cut pieces in predetermined spaced relationship on a faster-moving second web. More particularly, the present invention relates to apparatus and to a method for continuously cutting pieces from a first web, feeding the cut pieces, and associating the cut pieces of material with a second, carrier web that travels at a higher speed than that of the first web, and without stretching either the first web or the cut pieces.

2. Description of the Related Art

A number of different types of apparatus and methods have been devised to permit the feeding of sheets or pieces of material in predetermined spaced relationship along a moving carrier web. Generally, the carrier web is traveling at a higher speed than is the web of material from which the sheets or pieces are cut that are to be associated with the moving carrier web. When the respective webs of the materials to be joined are traveling at different speeds, such as is the case when cut pieces are to be deposited on a carrier web in spaced relationship relative to the direction of movement of the carrier web, the cut pieces move at a rectilinear speed that is slower than that of the carrier web so that the cut pieces can be properly spaced from each other when they are deposited on the carrier web. The cut pieces are then accelerated to match the rectilinear speed of the carrier web for placement thereon in a desired position. However, when the material from which the pieces are to be cut is extensible when placed under relatively low tension, the control of the length of the cut piece and its proper positioning on the carrier web is rendered more difficult because of the likelihood of stretching of the material during the steps of feeding, cutting, and transferring the cut pieces.

One technique that has been devised for matching the speeds of webs or sheets to be joined that initially are traveling at different speeds is disclosed in U.S. Pat. No. 5,693,165, entitled “Method and Apparatus for Manufacturing an Absorbent Article,” which issued on Dec. 2, 1997, to Christoff Schmitz. That patent discloses a laterally-moving shuttle that oscillates back and forth to periodically increase and decrease the speed of one of the parts to be joined, so that its speed can be matched with that of a carrier web in order to properly register cut pieces on the carrier web. However, the oscillatory movement of the shuttle imposes undesirable fluctuating stresses on the apparatus.

Another arrangement for joining parts of webs that travel at different speeds is disclosed in U.S. Pat. No. 5,759,340, entitled “Apparatus For Applying Discrete Parts Onto A Moving Web”, which issued on Jun. 2, 1998, to Boothe et al. That patent shows an arrangement in which an vacuum roll has radially shiftable segments that rotate about a common axis to allow changes in the speed of pieces cut from one web so they can be transferred to a second, faster-moving web.

A further approach to transferring and joining cut pieces to a moving web wherein the pieces and the moving web are traveling at different speeds is disclosed in U.S. Pat. No. 6,022,443, entitled “Method And Apparatus For Placing Discrete Parts Onto A Moving Web”, which issued on Feb. 8, 2000, to Rajala et al. That patent discloses the use of non-circular drive gears for driving a transfer mechanism that transfers the cut pieces, wherein the speed of the cut pieces can be changed to allow them to be properly registered with and positioned on the moving web.

Although the prior art contains disclosures directed to apparatus and methods for joining together two moving components that are initially moving at different speeds, the arrangements disclosed above can impose significant tension on the slower-moving element. Accordingly, if the slower-moving element has a low modulus of elasticity, significant stretching of the material can occur, which can be an undesirable condition if specific dimensional relationships must be maintained between the size of that element and its position relative to the component to which it is desired to be joined.

It is an object of the present invention to overcome the deficiencies of the prior art apparatus and methods.

SUMMARY OF THE INVENTION

Briefly stated, in accordance with one aspect of the present invention, a rotatable vacuum roll is provided for receiving a moving web, for guiding the web, and for transferring pieces cut from the web in timed relationship with a moving carrier web that passes over a portion of the periphery of the roll. The vacuum roll includes a cylindrical shell having a plurality of substantially longitudinally-extending rows of apertures that extend therethrough. A pair of axially-spaced end walls are secured to the shell and define shell ends. One end wall is an apertured end wall that includes a plurality of ports that extend through the apertured end wall and that are in fluid communication with respective rows of apertures in the shell. A stationary vacuum manifold is in surface contact with the apertured end wall, and it has at least one arc-shaped slot facing the apertured end wall for applying vacuum to selected rows of shell apertures through respective end wall ports as the roll rotates relative to the manifold.

In accordance with another aspect of the present invention, a method is provided for feeding, cutting, and transferring pieces of material from a moving web that is traveling at a slower rectilinear speed than the surface speed of the rotating vacuum roll to minimize elastic deformation of the web material.

BRIEF DESCRIPTION OF THE DRAWINGS

FIGS. 7A through 10A are partial enlarged views of the vacuum manifold shown in FIGS. 7 through 10, respectively.

DESCRIPTION OF THE PREFERRED EMBODIMENTS

Figure 1:
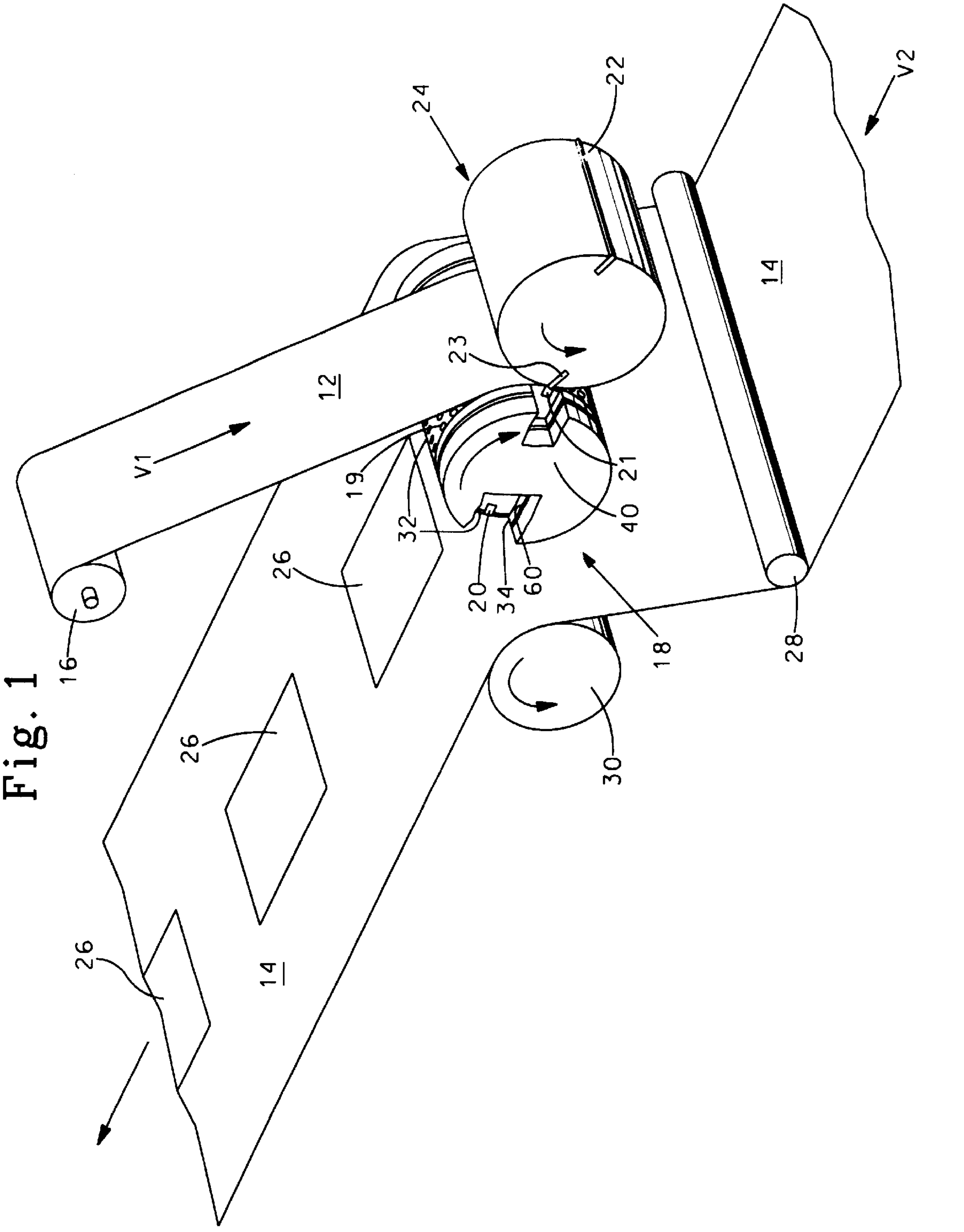
FIG. 1 is a perspective view showing an embodiment of apparatus in accordance with the present invention for feeding, cutting, and transferring cut pieces from an overlay web to a moving carrier web.

Referring now to the drawings, and particularly to FIG. 1 thereof, there is shown in diagrammatic form apparatus 10 for feeding, cutting, and combining cut pieces from a moving first web 12 of an overlay material for deposit onto a moving second, carrier web 14. Overlay material from web 12 can be a thin, readily extensible material having a low modulus of elasticity, such as a nonwoven, porous topsheet for a disposable absorbent article in the form of a disposable diaper, or the like. In that context, carrier web 14 can be a portion of a disposable diaper that includes a continuous web of a liquid-impervious backsheet material, such as a relatively thin polymeric film, and a plurality of longitudinally-spaced, overlying absorbent core portions, onto each of which core portions a cut piece of topsheet material having a predetermined longitudinal or machine-direction length is to be deposited and in predetermined registry with the absorbent core portion. Although the present invention has particular utility in the manufacture of such disposable absorbent articles, it is not limited to use in connection with such articles or to the materials from which such articles are customarily made. Those skilled in the art will appreciate that the present invention can be advantageously utilized in other contexts as well.

First web 12 is supplied from a supply roll 16 from which the overlay web is withdrawn at a first speed $V_1$ to pass onto the outer peripheral surface of a vacuum roll 18. The outer surface of vacuum roll 18 includes a plurality of apertures 19 that are in communication with a source of vacuum (not shown) to provide a predetermined holding force to hold web 12 against the peripheral surface of roll 18. Also included on the outer peripheral surface of roll 18 are a pair of peripheral anvils 20, 21 that are in diametrically opposed relationship and that are adapted to be contacted by a pair of peripheral cutter blades 22, 23 carried by a cutter roll 24 and in diametrically opposed relationship. Vacuum roll 18 and cutter roll 24 can each have the same diameter, as shown, and can be rotated at the same rotational speed, but in opposite directions, to continuously cut from web 12 a series of individual pieces 26 each having the same, predetermined machine-direction length. Alternatively, rolls 18 and 24 can have different diameters, but they should be driven to rotate so that their outer surfaces move at the same surface speed. In the embodiment shown, cutter roll 24 includes two cutter blades 22, 23 and vacuum roll 18 includes two anvils 20, 21 and therefore two pieces 26 of material are cut from web 12 during one complete rotation of each of vacuum roll 18 and cutter roll 24.

Carrier web 14 travels from a supply roll (not shown) at a second rectilinear speed $V_2$, which is a higher speed than $V_1$ at which web 12 travels. Carrier web 14 passes over the surface of a first idler roll 28 and then into the nip formed by a second idler roll 30 and vacuum roll 18 and then passes over a portion of second idler roll 30 to a downstream station (not shown) for further processing. After passing over second idler roll 30 carrier web 14 includes a series of registered cut pieces 26 that have been cut from web 12 and that are in predetermined positions on web 14 and in predetermined spaced relationship relative to each other. The rectilinear speed of web 14 is equal to the peripheral speeds of each of vacuum roll 18 and cutter roll 24, so that there is no slippage between the carrier web and those rolls.

Figure 2:
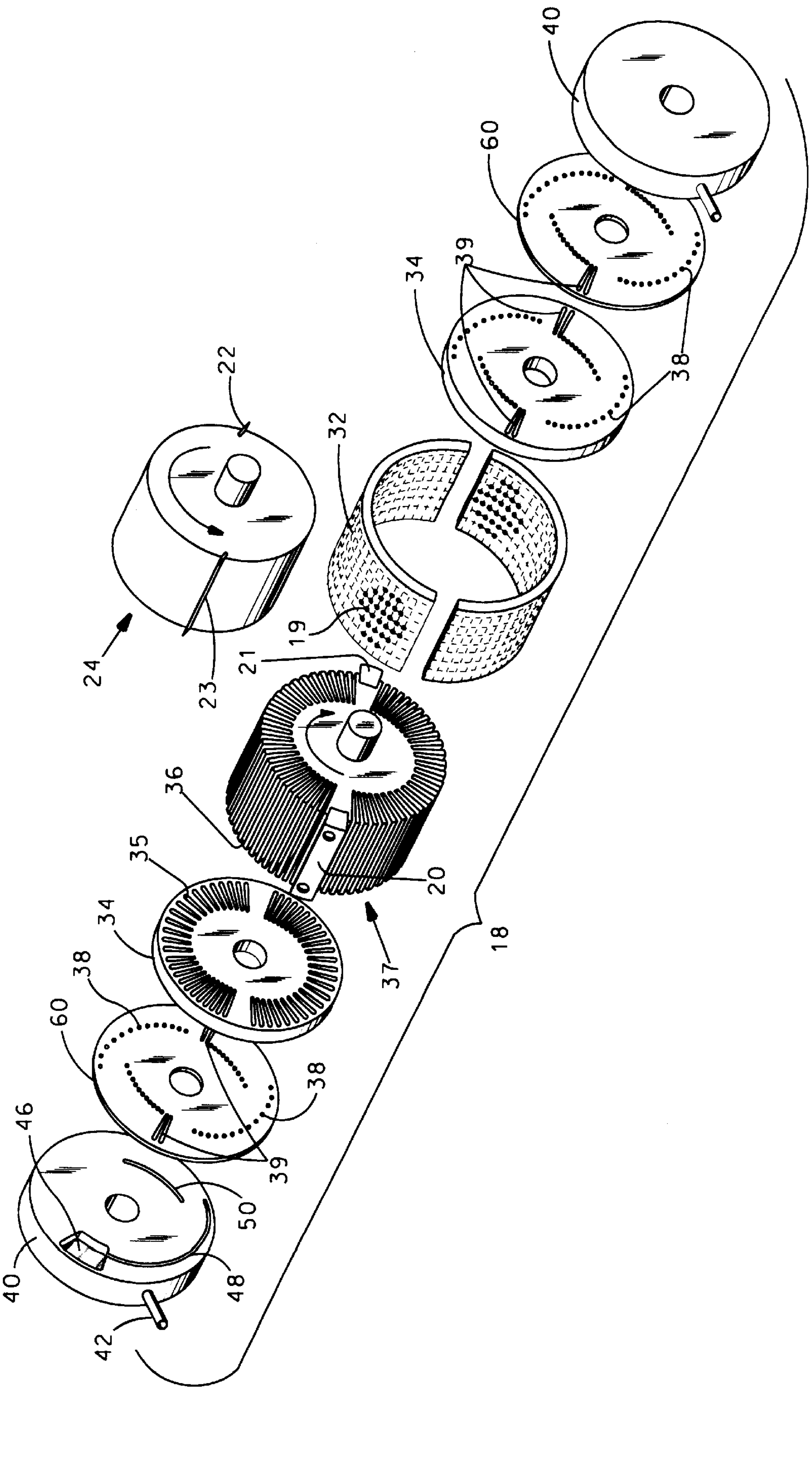
FIG. 2 is an exploded view of a vacuum roll in accordance with the present invention in which the vacuum roll has vacuum openings provided in its outer shell.

The structure of vacuum roll 18 is shown in FIG. 2. Roll 18 is a hollow structure that includes an outer shell 32 that has a plurality of vacuum apertures 19 distributed over the surface thereof. Preferably, vacuum apertures 19 are provided in spaced, longitudinally-extending rows of apertures that are substantially parallel to each other. However, vacuum apertures 19 need not be in longitudinally-aligned relationship as shown, but can be in a different form of pattern, depending upon the form of the cut that is made by cutter blades 22, 23. For example, instead of a cut that is perpendicular to the machine direction of web 12, the cut can be of an angular form, such as a chevron-type cut, if desired.

Roll 18 also includes a pair of end walls 34 that are in the form of discs and that are in longitudinally-spaced relationship, to define with cylindrical outer shell 32 a tubular, hollow roll. Positioned within the interior of roll 18 is an inner roll 37 having a plurality of longitudinally-extending, circumferentially-spaced vacuum channels 36. Each vacuum channel 36 is positioned adjacent to and is in communication with at least one row of peripheral apertures 19 in outer shell 32. Additionally, at least one end wall 34 includes a plurality of vacuum ports 38 and vacuum channels 35 that overlie and that are in communication with the ends of respective ones of vacuum channels 36 of the inner roll 37. Although illustrated and described as a hollow roll, it will be appreciated by those skilled in the art that roll 18 can, instead, be a solid roll with suitable internal vacuum passageways.

Positioned against the outer face of vacuum roll end wall 34 that includes ports 38 is a vacuum manifold 40, which for convenience is shown as spaced from end wall 34 for clarity of illustration. Manifold 40 can be disc-shaped as shown, and has a planar outer surface that faces and that is adapted to engage with the planar outer surface of end wall 34. Manifold 40 includes discrete internal chambers that are adapted to be connected with a source of vacuum through a pair of vacuum conduits 42, 44. As shown, vacuum manifold 40 includes a web grip chamber 46, a web slip chamber 48, and a sheet hold chamber 50. In the structure shown, web grip chamber 46 and web slip chamber 48 are connected with each other and are in communication with vacuum conduit 42, whereas sheet hold chamber 50 is spaced from and independent of chambers 46 and 48 and is in communication with vacuum conduit 44.

Figure 3:
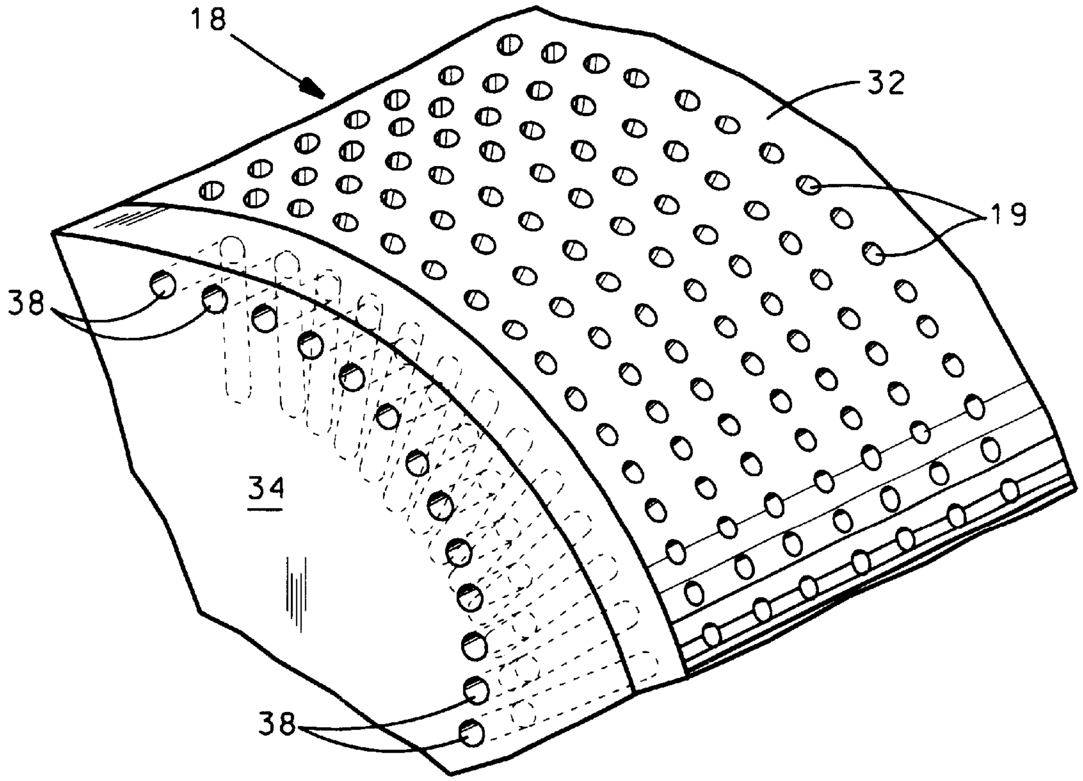
FIG. 3 is an enlarged, fragmentary, perspective view of the vacuum roll of FIG. 2 showing the arrangement of the vacuum openings in the shell periphery and the arrangement of vacuum apertures in the roll end wall.

FIG. 3 shows in enlarged form a portion of the outer surface of outer shell 32 and a portion of the adjacent outer surface of end wall 34 of vacuum roll 18. As shown, an end of each of vacuum channels 36 communicates with a single vacuum port 38 provided in end wall 34. And each of vacuum ports 38 shown in FIG. 3 is at a different radial distance, relative to the axis of roll 18, than is the immediately adjacent port. Additionally, each of vacuum channels 36 is in communication with a single, longitudinally-extending row of vacuum apertures 19.

Figure 4:
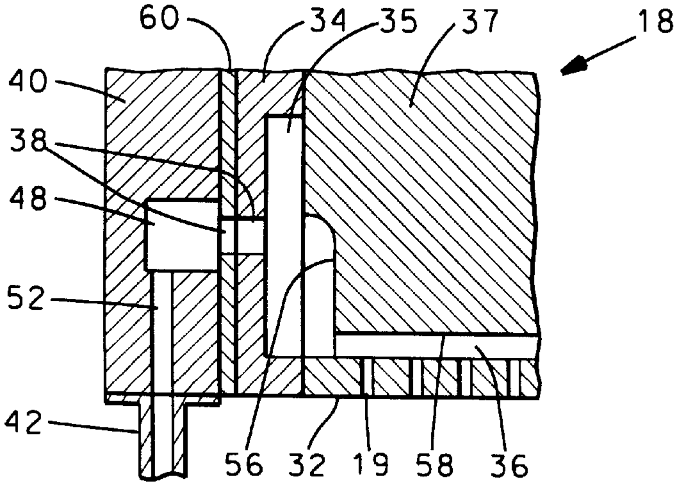
FIG. 4 is an enlarged, fragmentary, cross-sectional view taken at a corner of the vacuum roll of FIG. 3, taken at the junction of the roll outer shell and the roll end wall, showing the vacuum communication passageways between the vacuum roll and a vacuum manifold.

Referring now to FIG. 4, there is shown a typical communication path between one of the vacuum conduits connected with vacuum manifold 40 and the respective vacuum apertures 19 in outer shell 32 of vacuum roll 18. Vacuum conduit 42 is in communication with a source of vacuum (not shown) and a passageway 52 extends interiorly of vacuum manifold 40 from vacuum conduit 42 to a vacuum chamber, in this instance web slip chamber 48. Slip chamber 48 of manifold 40 faces vacuum roll end wall 34. In the instance shown, slip chamber 48 is an arc-shaped slot, the form and orientation of which will be hereinafter further described, and it is in communication with one of the vacuum ports 38 provided in roll end wall 34. Vacuum port 38 is, in turn, aligned with and is in communication with one of longitudinally-extending vacuum channels 36 that extends longitudinally within vacuum roll 18. As shown, vacuum channel 36 includes an inwardly-directed end wall segment 56 that extends radially relative to vacuum roll 18 and is adjacent roll end wall 34, and a shell segment 58 that extends longitudinally within roll outer shell 32 and that communicates with the respective longitudinally-aligned vacuum apertures 19 that extend through outer shell 32. A suitable sealing member 60 is provided between the stationary vacuum manifold 40 and the rotatable vacuum roll end wall 34 to confine the vacuum to the respective channels and passageways and to minimize air flow between the opposed manifold and roll end wall surfaces outside of the intended interconnections. In that regard, suitable sealing arrangements will be apparent to those skilled in the art, and consequently such sealing arrangements are not further described herein.

Figure 5:
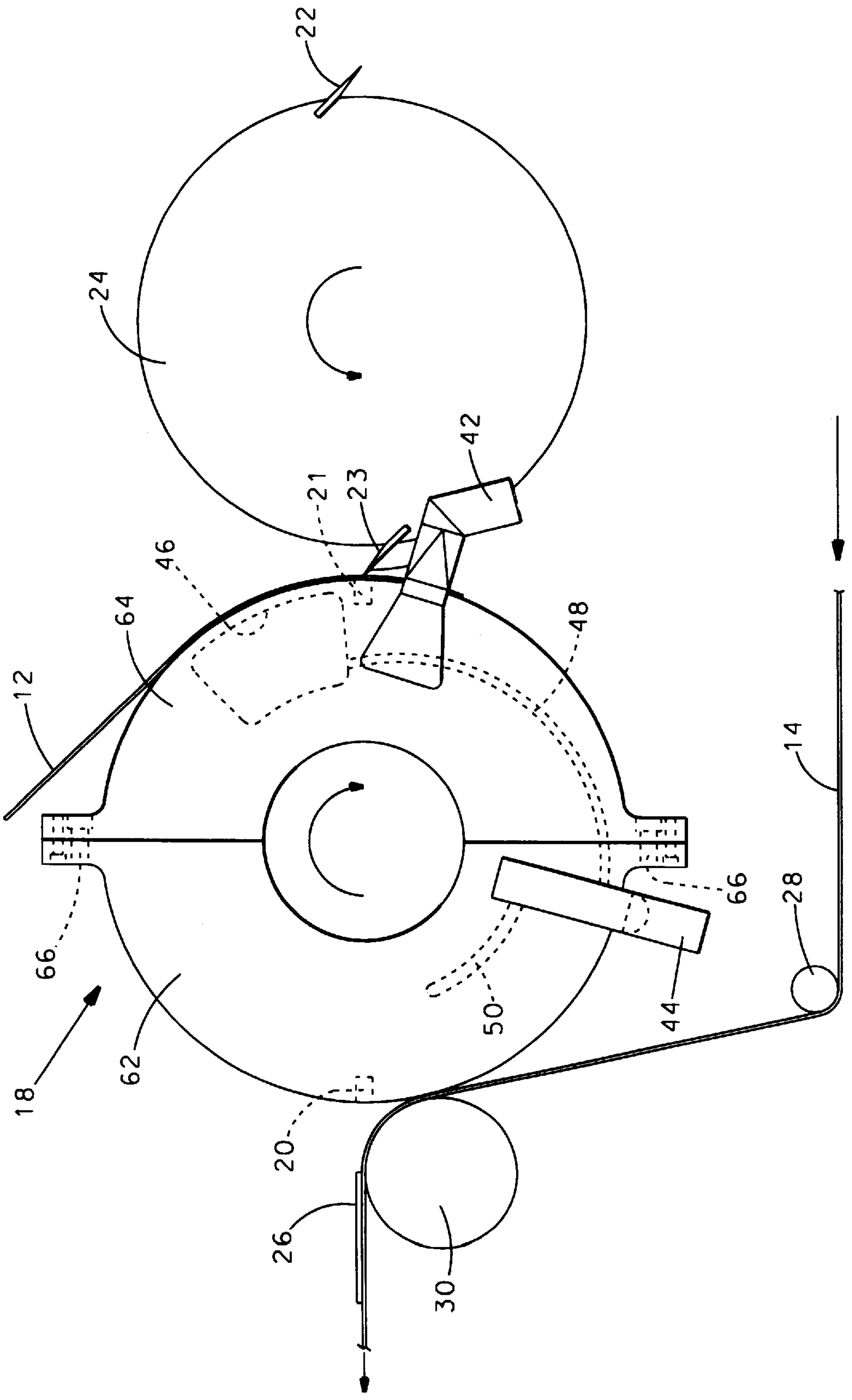
FIG. 5 is an end view of the vacuum roll and an adjacent, counter-rotating cutter roll showing the vacuum connections and the several vacuum slots that are provided in the vacuum manifold.

An outside end view of vacuum manifold 40 is shown in FIG. 5. Manifold 40 can be defined by a pair of semi-circular discs 62, 64, as shown, that are held together by suitable connecting bolts 66. Positioned within manifold 40 are the several vacuum chambers including web gripping chamber 46, web slip chamber 48, and sheet hold chamber 50. As shown, web gripping chamber 46 and web slip chamber 48 are interconnected, and thus connection with a single source of vacuum (not shown) through vacuum conduit 42 provides vacuum to each of web gripping chamber 46 and web slip chamber 48. Sheet hold chamber 50 is spaced angularly from and is independent of each of web gripping chamber 46 and web slip chamber 48, and hold chamber 50 has an independent vacuum conduit 44 for communication with a source of vacuum (not shown). Sheet hold chamber 50 can be placed in communication with a source of high vacuum, of the order from about 15 in. $H_2O$ to about 80 in. $H_2O$, depending upon the porosity of the material, in order to securely hold a cut sheet against the outer surface of roll outer shell 32 without slippage. On the other hand, web gripping chamber 46 and web slip chamber 48 can be in communication with a source of vacuum that is at a lower vacuum level than that in sheet hold chamber 50, and can be of the order from about 3 in. $H_2O$ to about 40 in. $H_2O$, again, depending upon the porosity of the material, in order to allow the incoming web 12 of extensible material to slip relative to the outer peripheral surface of vacuum roll 18, as will be described in more detail hereinafter. Also shown in FIG. 5 are cutter roll 24, carrier web 14 upstream of vacuum roll 18, and carrier web 14 and a cut piece 26 in contacting relationship therewith after carrier web 14 has passed around a portion of the outer periphery of vacuum roll 18.

Figure 6:
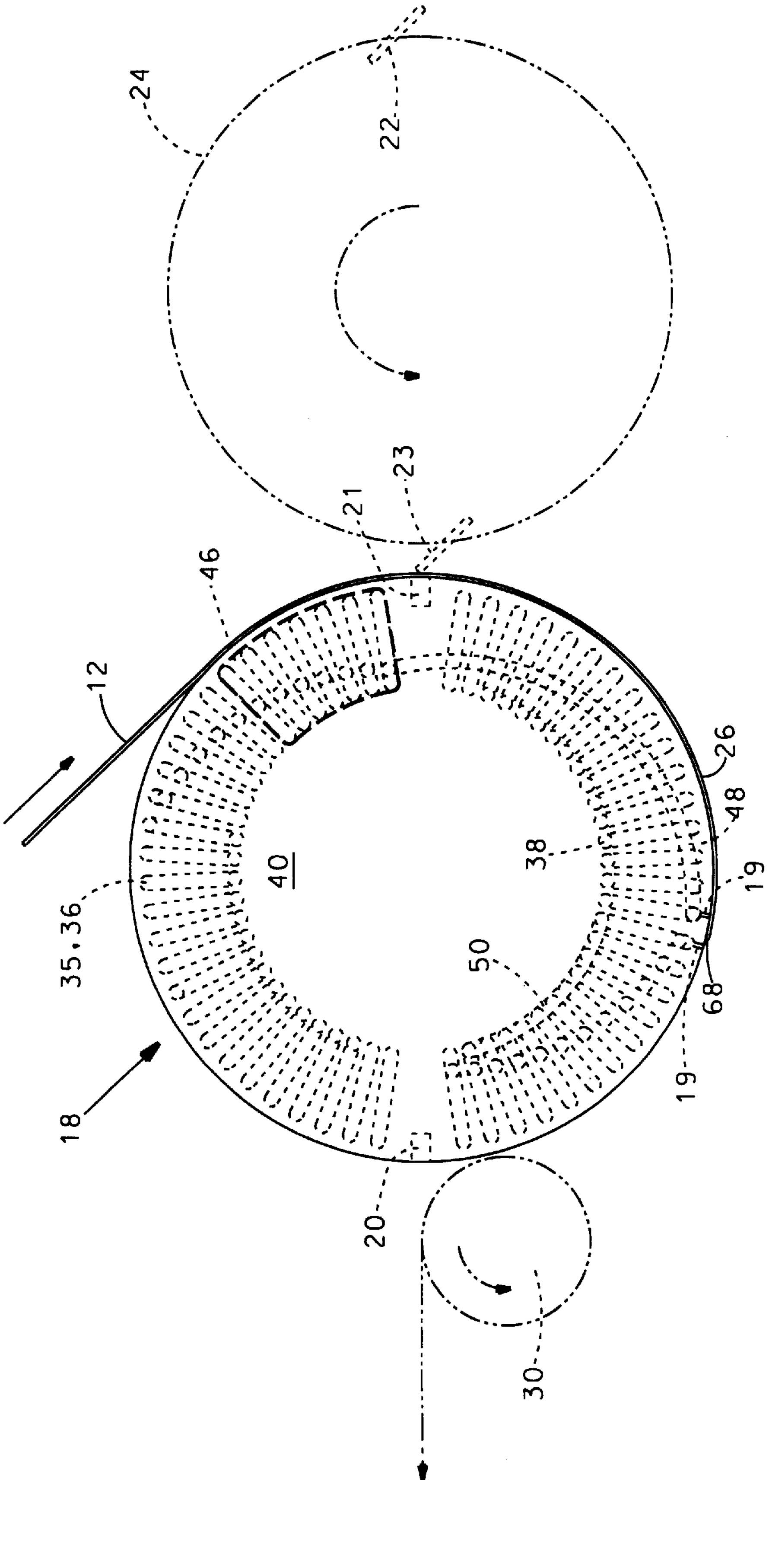
FIG. 6 is an end view similar to that of FIG. 5 showing the vacuum ports in the vacuum roll end wall relative to the vacuum slots in the vacuum manifold at one position of the vacuum roll.

The positional relationship between the respective vacuum ports 38 that are provided in vacuum roll end wall 34 and the outlet slots of respective vacuum chambers 46, 48, 50 provided in vacuum manifold 40 are shown in FIG. 6 for one position of vacuum roll 18. As shown, vacuum roll 18 includes a pair of diametrically opposed, external anvil surfaces that are adapted to come into engagement with respective cutter elements carried by the adjacent cutter roll 24. In that regard, vacuum roll 18 and cutter roll 24 are shown at a point when cutter blade 23 is in contact with anvil 21 to effect a transverse cut in web 12 as it is fed onto the outer peripheral surface of vacuum roll 18 as the roll rotates in a clockwise direction as shown in FIG. 6. Also carried on the outer surface of vacuum roll 18 is a previously-cut section 26 of material from web 12, the previously-cut section having a leading edge 68 that is spaced along the outer periphery of vacuum roll 18 from anvil 20 and that was formed by the engagement of cutting element 22 with anvil 20 at an earlier angular position of vacuum roll 18. Cutting element 23 and anvil 21 are shown as in engagement to provide a separating cut to separate cut section 26 from web 12. In the position of cut section 26 shown, leading edge 68 is held firmly against the outer peripheral surface of vacuum roll 18 by means of vacuum that is supplied from sheet hold chamber 50 through ports 38 and through vacuum channels 35 and 36 to the apertures 19 in the outer periphery of vacuum roll 18.

Figure 7:
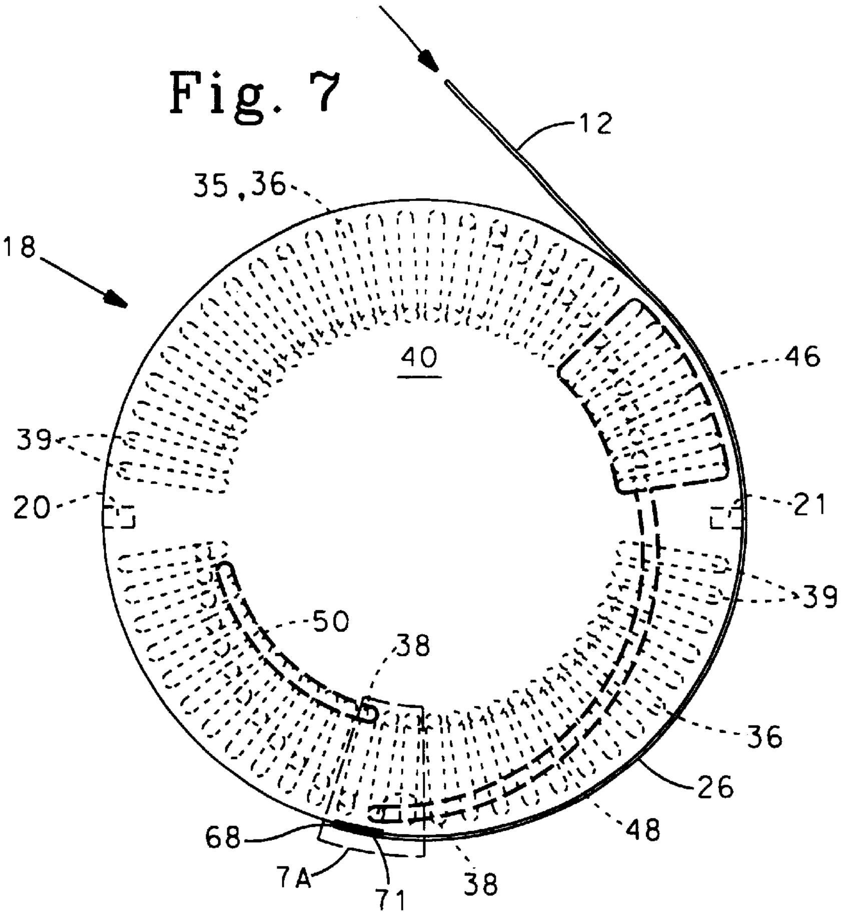
FIGS. 7 through 10 are sequential views showing the orientation of the vacuum ports in the vacuum roll end wall relative to the vacuum slots in the vacuum manifold at different relative positions of the vacuum roll and the vacuum manifold, as well as the peripheral positions on the vacuum roll surface of cut portions of an incoming web as the vacuum roll is rotated.
Figure 7A:
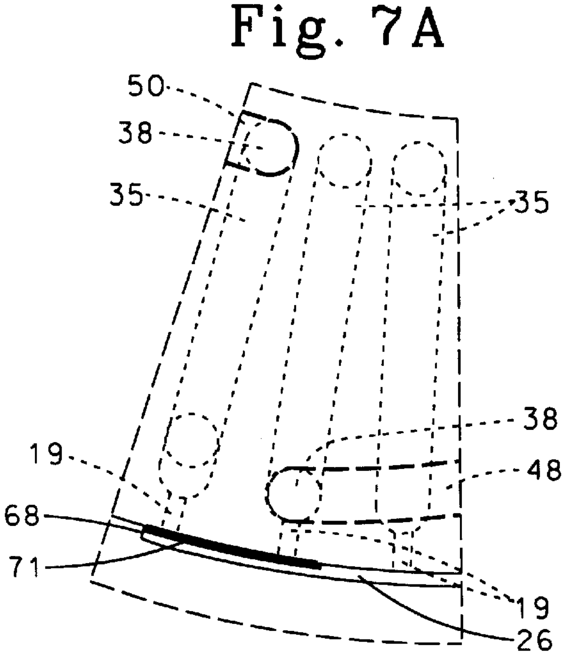

The position of a cut piece 26 and its leading edge 68 relative to the peripheral surface of vacuum roll 18 as roll 18 rotates relative to stationary manifold 40 is shown in FIGS. 7 through 10. In FIG. 7, the various elements are in the same relative positions as shown in FIG. 6, with cut piece 26 having been severed from web 12, and with web 12 held against the peripheral surface of vacuum roll 18 by the vacuum provided from the web gripping chamber 48 through ports 38 vacuum channels 35 and 36 to the apertures 19 in the outer periphery of vacuum roll 18.

Figure 8:
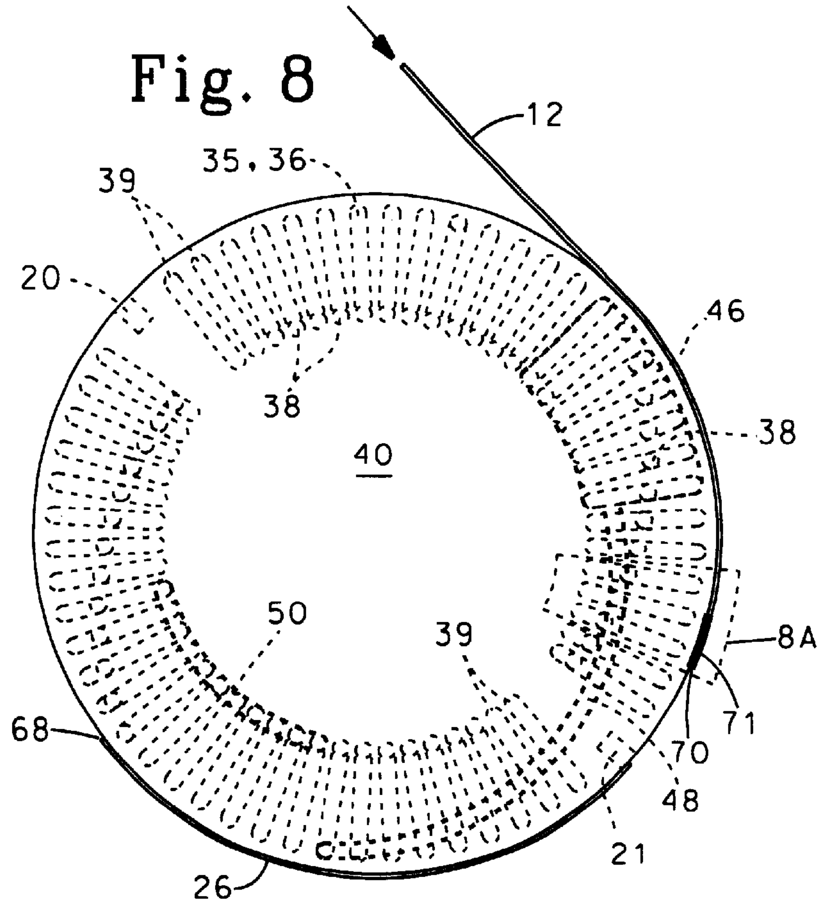
Figure 8A:
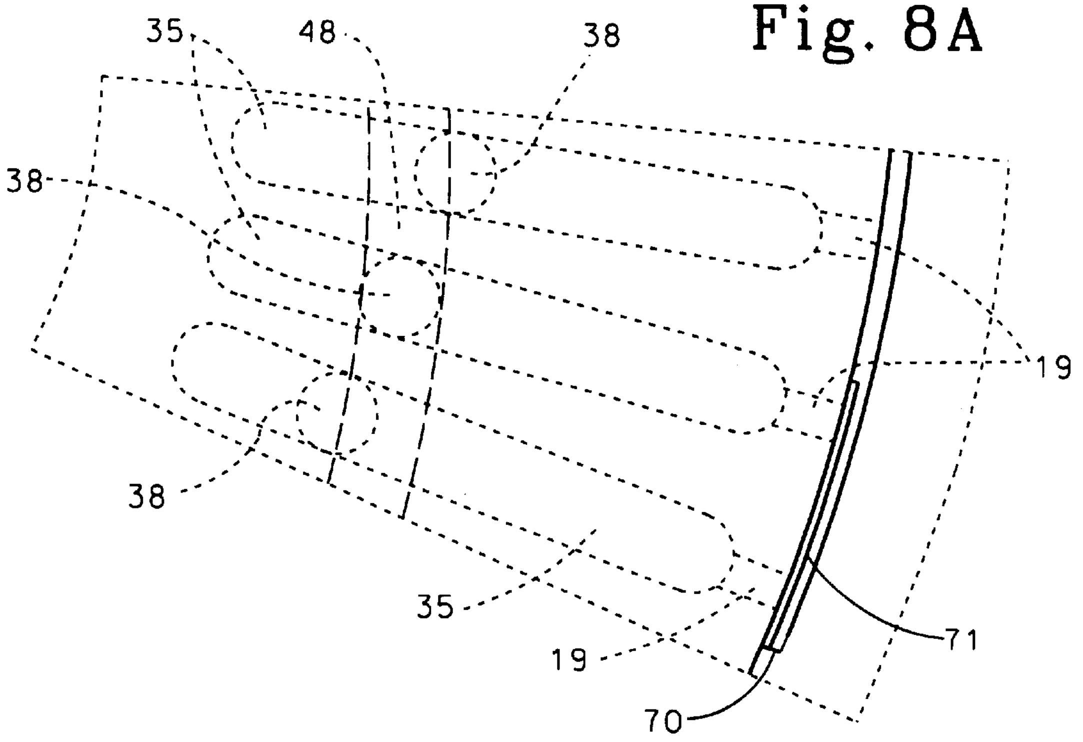

In FIG. 8, vacuum roll 18 has rotated in a clockwise direction through an angle of rotation of approximately 50 degrees from the position shown in FIG. 7. As vacuum roll 18 has rotated through that angle, leading edge 68 of cut piece 26 has been brought into communication with sheet hold chamber 50 of vacuum manifold 40, as a result of which a relatively high level of vacuum has been applied to a large area of cut piece 26. Additional rotation of vacuum roll 18 causes further vacuum ports 38 of vacuum roll 18 to come into communication with sheet hold chamber 50, to thereby continue to hold cut piece 26 firmly onto the periphery of vacuum roll 18. At the same time, leading edge 70 of web 12, which will become the leading edge of a second cut piece 26, has slipped counterclockwise relative to the peripheral surface of vacuum roll 18, away from anvil 21, by virtue of the fact that the peripheral speed of vacuum roll 18 is greater than the rectilinear speed of incoming web 12, and by virtue of the relatively low holding force applied to web 12 through web gripping chamber 46. Additionally, during the rotation of vacuum roll 18 through that degree of arc from the position shown in FIG. 7 to the position shown in FIG. 8, the portion of the peripheral surface of vacuum roll 18 through which vacuum is applied to leading edge 70 of web 12, zone 71, moves rearwardly, relative to the direction of rotation of vacuum roll 18. The rearward movement of zone 71 results from the different orientation of the arc that is described by the series of vacuum ports 38 in vacuum roll end wall 34 (see FIGS. 2–4) as compared with that of the arc of the slot defined by web slip chamber 48 formed in vacuum manifold 40. As shown, and when viewed in a clockwise direction, the arc described by the series of vacuum ports 38 has a radius, relative to the axis of roll 18, that progressively decreases in a clockwise direction, whereas the radius of the arc defined by web slip chamber 48 progressively increases in a clockwise direction, thereby defining intersections in which two vacuum ports are in communication with web slip chamber 48 at any point in time. In that regard, the directions of the arcs described by ports 38 and by slip chamber 48 can be interchanged, if desired.

As a result of the different orientation of those arcs, the peripheral surface of vacuum roll 18 that is in communication with the source of vacuum shifts rearwardly, relative to the direction of rotation of vacuum roll 18. Consequently, because the rectilinear speed of web 12 is slower than the peripheral speed of vacuum roll 18, leading edge 70 of web 12 is allowed to slip relative to the surface of roll 18, and the amount of slippage corresponds with the movement of the vacuum zone beneath leading edge 70. The relatively low vacuum provided in web slipping chamber 48 holds leading edge 70 loosely against the surface of the vacuum roll 18, allowing web 12 to slip relative to that surface, so that web 12 is not subjected to tension at a level that could result in machine direction stretching of web 12. The arc length of the vacuum gripping zone beneath leading edge 70 to provide a sufficient leading edge holding force that also allows slippage of the web is dependent upon the nature and porosity of the web material, and can range from an arc length of from about 1 mm to about 100 mm. Preferably, the arc length is sufficiently small so as not to permanently elongate the web material, yet sufficient to maintain the leading edge against the surface of the vacuum roll. In that regard, the number of roll end wall ports that are in communication with slipping chamber 48 at any one time are shown as two such ports, and that number can preferably be of the order of no more than about four such ports.

Figure 9:
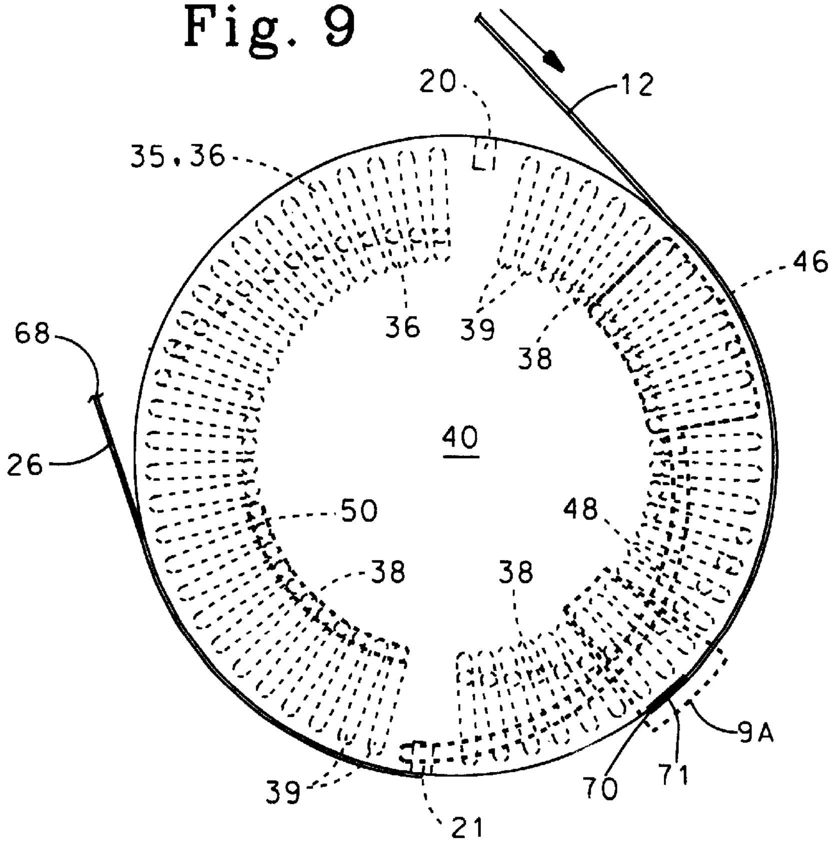
Figure 9A:
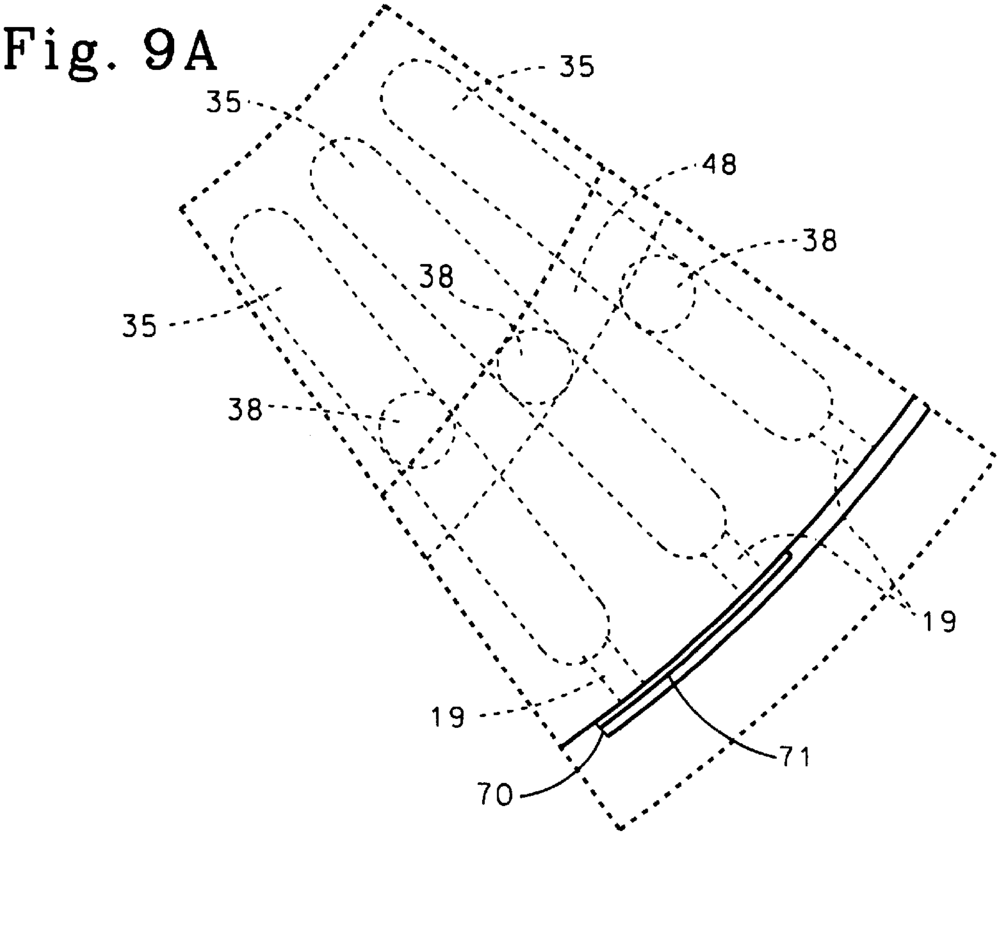

In FIG. 9, the vacuum roll has traveled through an additional arc of about 40 degrees beyond the position shown in FIG. 8. As shown, cut piece 26 is still retained against the peripheral surface of vacuum roll 18 by the relatively high vacuum provided in sheet hold chamber 50, but that vacuum level is applied only to given area of cut piece 26, in order to allow leading edge 68 of cut piece 26 to separate from vacuum roll 18 and to come into engagement with and to move with the carrier web (not shown). The zone 71 continuous to move rearwardly from the anvil 21, under a relatively low vacuum provided to the zone 71 from the web slipping channel 48 through ports 38 and through vacuum channels 35 and 36 to the apertures 19 in the outer periphery of vacuum roll 18.

Figure 10:
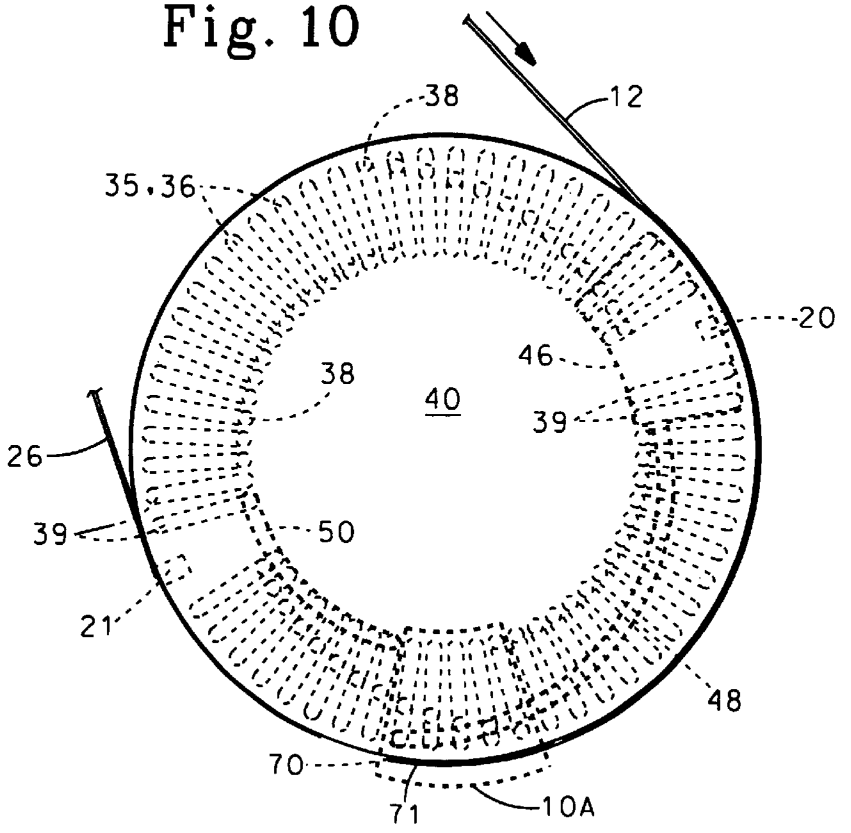
Figure 10A:
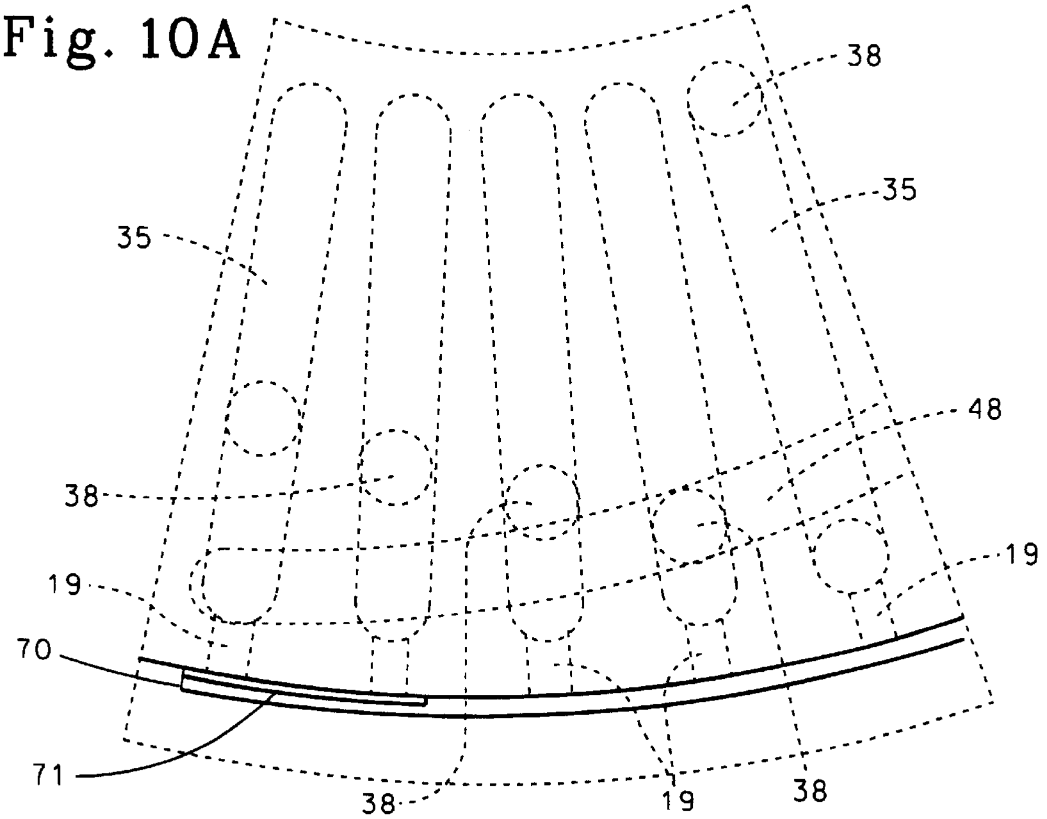

In FIG. 10, vacuum roll 18 has progressed through an additional arc of approximately 60 degrees beyond the position shown in FIG. 9. At the FIG. 10 position, cut piece 26 is released from the vacuum imposed through the peripheral surface of vacuum roll 18 and is almost completely separated from vacuum roll 18. In the meantime, leading edge 70 of what will become a second cut piece 26 has traveled to the point that it overlies a longitudinal channel 36 (see FIGS. 2 and 4) that is in communication with a port 38 has come into contact with sheet hold chamber 50 in preparation for the severance of the second cut section from web 12 so that upon severance the cut section can be accelerated to the peripheral speed of vacuum roll 18 for subsequent combination with the carrier web. From the position shown in FIG. 10, vacuum roll 18 continues to rotate until it reaches the position shown in FIG. 7, at which point a cut is made in web 12 to define the trailing edge of the second cut piece, whereupon the cycle is repeated.

During the time a cut sheet is moving with roll 18 at the same speed as that of the surface of the roll, the tail end of a cut section 26 is retained on the roll surface by vacuum. The vacuum is communicated through chambers 48, 50, and through a pair of adjacent, radially-extending elongated ports 39 provided in end wall 34, as shown in FIGS. 7 through 10. Additionally, it will be seen that with the arrangement as shown in FIGS. 2 and 7 through 10, two cut pieces are provided for each revolution of the vacuum roll. In that configuration, the respective cut pieces are relatively short, and are spaced from each other along the carrier web at a predetermined spacing.

An embodiment of the present invention in which only a single cut piece **26*a* is provided for each revolution of vacuum roll 18*a* is shown in FIGS. 11 through 15. In that embodiment, the end wall of vacuum roll 18*a* roll includes a single, spiral-like series of vacuum ports 38*a* in the roll end wall. Additionally, several radially-elongated ports 39*a* are provided at a point adjacent to the innermost end of the spiral-like arc of ports 38*a* to provide vacuum at the roll surface, over approximately one-half a revolution of roll 18*a***, to hold the tail portion of a cut piece against the roll surface.

As shown in FIGS. 11 through 15, vacuum roll **18*a* rotates in a counterclockwise direction, with a cutter roll (not shown) positioned below it. Web 12*a* of material that is to be cut and provided in sheet form to be joined with carrier web 14*a* is fed from a supply roll (not shown) and is fed toward the lowermost portion of vacuum roll 18*a*. As shown, carrier web 14*a* travels above vacuum roll 18*a* and consequently the cut pieces are deposited on a downwardly-facing surface of carrier web 14*a***.

Figure 11:
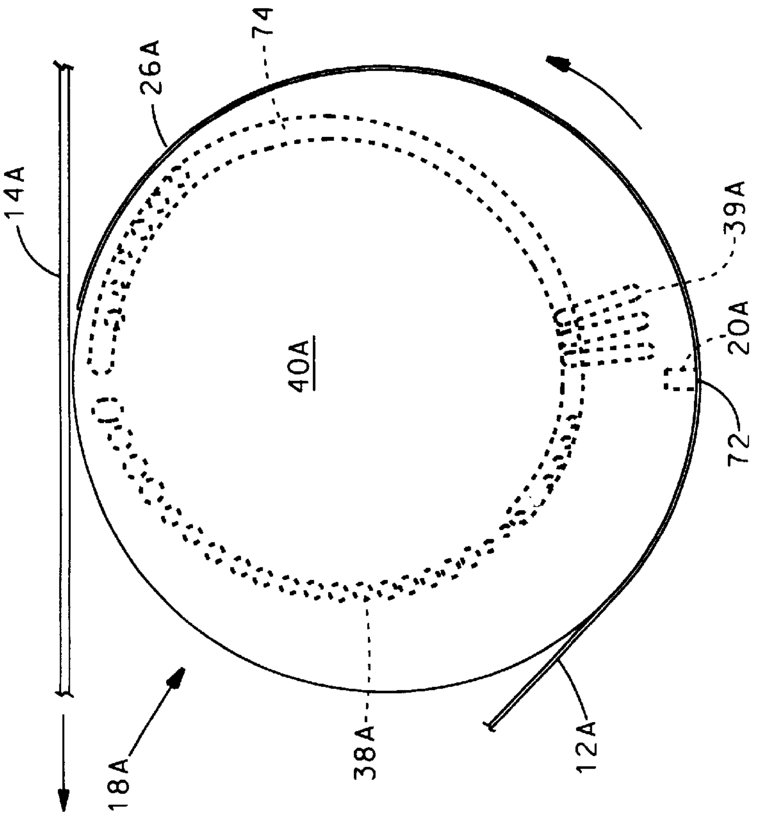

In FIG. 11, a first cut section **26*a* is shown and is held against the outer surface of vacuum roll 18*a* by vacuum ports 38*a* that are radially outermost in the spiral-like arc of ports. Additionally, trailing edge 72 of cut piece 26*a* is retained against the surface of vacuum roll 18*a* by means of radially-extending elongated ports 39*a*, which provide communication over about 180° of arc between the single, spiral-like vacuum slot 74 that is provided in the vacuum manifold. In the position shown in FIG. 12, vacuum roll 18*a* has rotated counterclockwise through an arc of approximately 50° and the relatively long cut section 26*a* is in partial contact with the overlying carrier web 14*a*. In the meantime, leading edge 68*a* of web 12*a* has slipped along the peripheral surface of vacuum roll 18*a* from a point adjacent anvil 20*a*** to an angular position approximately 30° behind it.

Figure 12:
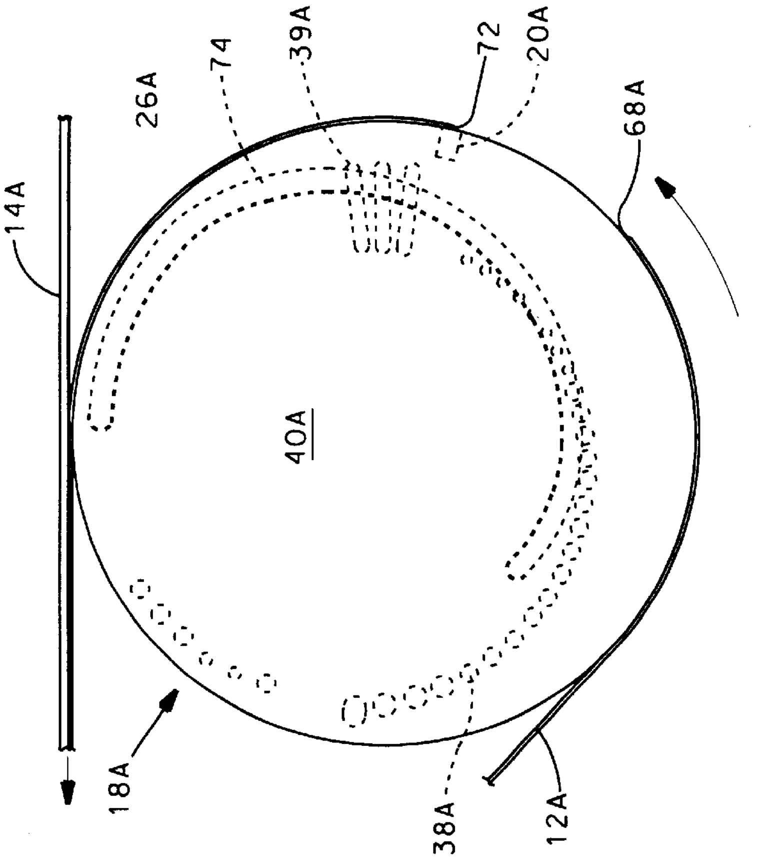
FIGS. 11 through 15 are sequential views similar to those of FIGS. 7 through 10, but showing a different vacuum port arrangement provided in an vacuum roll end wall and a different vacuum slot configuration provided in a vacuum manifold.
Figure 13:
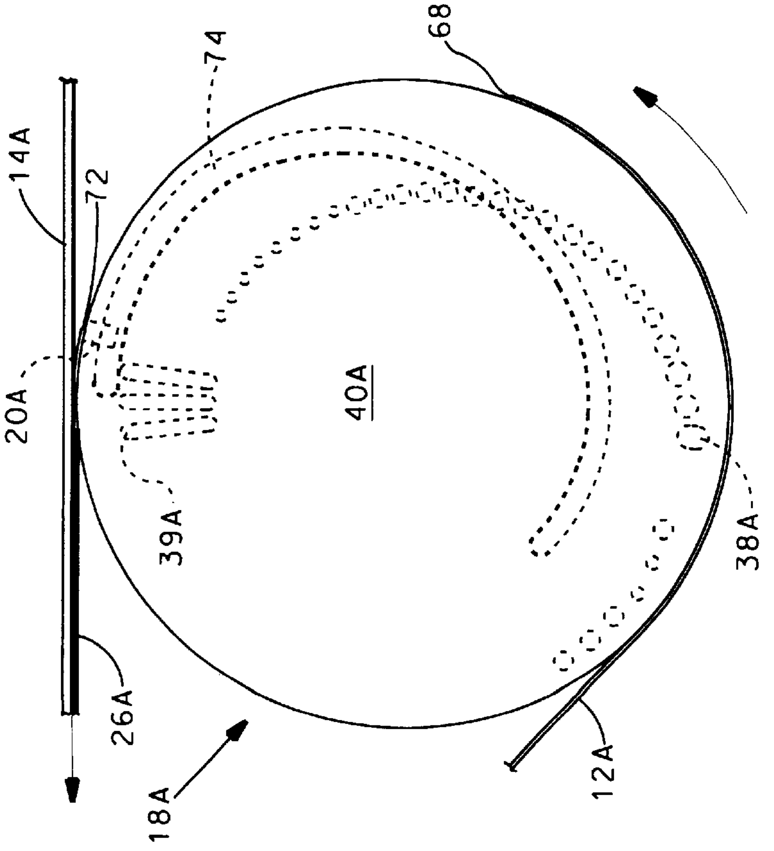

In FIG. 13, vacuum roll **18*a* has traversed an arc of approximately 90° beyond the position shown in FIG. 12, and the first cut portion 26*a* is substantially in complete contact with carrier web 14*a* and at a time immediately prior to complete removal of that cut piece from vacuum roll 18*a*. In the meantime, leading edge 68*a* of web 12*a* has slipped in a clockwise direction along the surface of vacuum roll 18*a* to a point approximately 90° rearward of anvil 20*a***.

Figure 14:
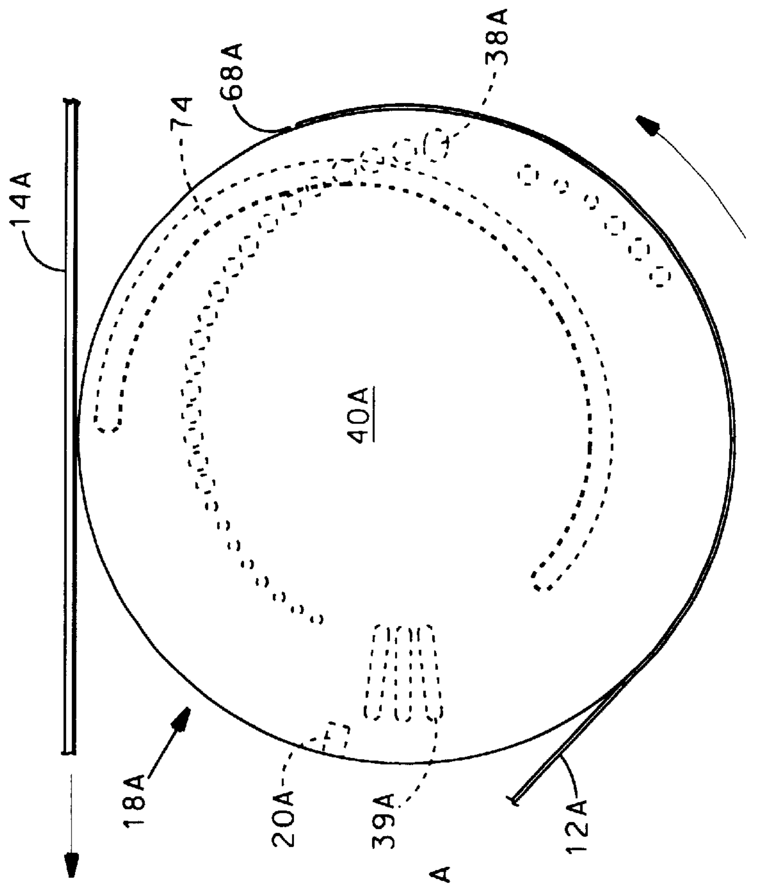

In FIG. 14, vacuum roll **18*a* has advanced an additional 90° beyond the position shown in FIG. 13 and in a counterclockwise direction. Leading edge 68*a* of web 12*a* has slipped rearwardly along the peripheral surface of vacuum roll 18*a* so that it is at a position approximately 140° rearwardly of anvil 20*a***.

Figure 15:
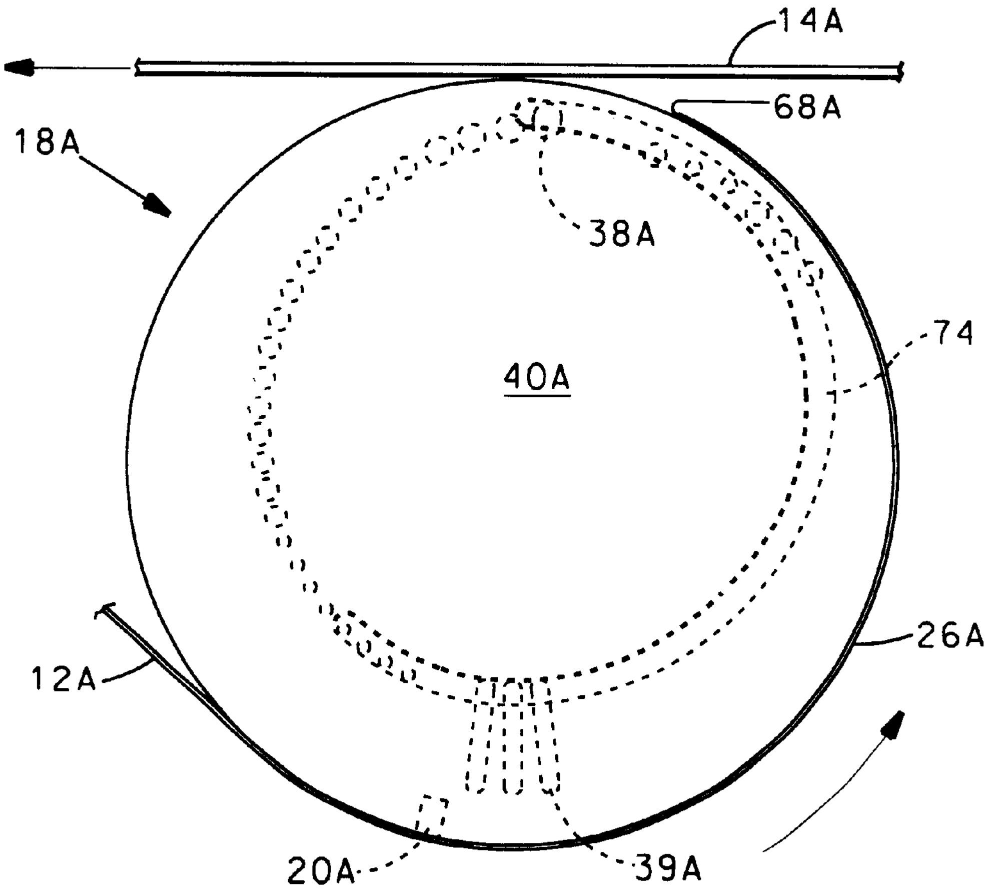

In FIG. 15, vacuum roll 18*a* has advanced approximately 90° beyond the position shown in FIG. 14. At the point shown in FIG. 15, leading edge 68*a* of web 12*a* has slipped more than 180° beyond the initial cut point corresponding with the anvil position. Additional rotation of approximately 20° beyond that shown in FIG. 15 will bring the parts to the positions shown in FIG. 11, at which the cutter roll will engage with anvil 20*a* to cut the sheet and determine its trailing edge.

As hereinabove described, the leading edge of the web from which cut pieces are to be severed is permitted to slip relative to the vacuum roll. At the same time, the vacuum that is applied at the leading edge of the web shifts rearwardly over the peripheral surface of the vacuum roll to correspond with the position of the leading edge of the web. As a result, the web is subjected to only minimal tension, and it is therefore not stretched or deformed, as would be the case if continuous high vacuum were to be applied to the web as the vacuum roll rotates. Therefore, the present apparatus and method are very advantageous when extensible webs are desired to be fed, cut, and transferred to a carrier web that is moving at a higher speed. Moreover, the shifting of the point of application of vacuum to the web leading edge is effected by providing spiral-like vacuum ports in the vacuum roll end wall, and at least one spiral-like vacuum slot in the vacuum manifold. In that connection, it is important that the directions of the respective spiral-like ports and slots be opposite from each other in order to allow shifting of the effective point of vacuum application along the vacuum roll peripheral surface in order for the vacuum to follow the receding web leading edge and not impose significant tension on the web. As will be appreciated, however, the precise arc of the vacuum ports in the vacuum roll and the precise arc of the vacuum slots in the vacuum manifold will be dependent upon a number of factors, including the vacuum roll and vacuum manifold diameters, the speed of rotation of the vacuum roll, the rectilinear speed of the material to be cut into sheets, and the like.

Additionally, although illustrated and described herein as in the form of arcs, the form of web grip chamber 46, of web slip chamber 48, and of sheet hold chamber 50 can take other geometric forms, based upon the desired operating conditions.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A rotatable vacuum roll for receiving a moving web, for guiding the web, and for transferring pieces cut from the web in timed relationship with a moving carrier web that passes over a portion of the periphery of the roll, said vacuum roll having an axis of rotation and comprising:

a. a cylindrical shell having a plurality of substantially longitudinally-extending rows of apertures extending therethrough to define an apertured vacuum roll peripheral surface, a pair of axially-spaced end walls secured to the shell and that define shell ends, wherein one end wall is an apertured end wall that includes a plurality of ports that extend through the apertured end wall and that are in fluid communication with respective rows of apertures in the shell; and b. a stationary vacuum manifold in surface contact with the apertured end wall, the manifold having at least one elongated slot facing the apertured end wall for applying vacuum to selected groups of adjacent rows of apertures in the shell through respective end wall ports as the roll rotates relative to the manifold to provide a circumferentially-moving vacuum zone on the roll peripheral surface, wherein the vacuum manifold includes a first, continuous, arc-shaped slot facing and contacting the apertured end wall and having a predetermined width in the radial direction of the roll, wherein the radius of a centerline of the first, arc-shaped slot varies from a first radius at a point adjacent the shell to a second, smaller radius at a point radially inward of the shell.

2. A vacuum roll in accordance with claim 1, wherein the manifold includes a second, continuous, arc-shaped slot facing the apertured end wall and spaced from the first arc-shaped slot, wherein the radius of a centerline of the second arc-shaped slot is substantially uniform relative to the axis of rotation of the roll.

3. A vacuum roll in accordance with claim 2, wherein the vacuum manifold includes a third arc-shaped slot adjacent the shell, the third slot having an outer radius corresponding substantially with the first radius of the first slot and having an inner radius corresponding substantially with the second radius of the first slot.

4. A vacuum roll in accordance with claim 3, wherein the respective first, second, and third manifold openings are positioned sequentially in a circumferential direction relative to the manifold.

5. A vacuum roll in accordance with claim 3, wherein the third arc-shaped slot sequentially overlies each of the groups of ports as the roll rotates relative to the vacuum manifold.

6. A vacuum roll in accordance with claim 1, wherein the first arc-shaped slot overlies and is in fluid communication with no more than four adjacent ports in the apertured end wall at any one time as the roll rotates relative to the vacuum manifold.

7. A vacuum roll in accordance with claim 2, wherein the second arc-shaped slot overlies the constant radius grouping of ports for a portion of a rotation of the vacuum roll as the roll rotates relative to the vacuum manifold.

8. A rotatable vacuum roll for receiving a moving web, for guiding the web, and for transferring pieces cut from the web in timed relationship with a moving carrier web that passes over a portion of the periphery of the roll, said vacuum roll having an axis of rotation and comprising:

a. a cylindrical shell having a plurality of substantially longitudinally-extending rows of apertures extending therethrough to define an apertured vacuum roll peripheral surface, a pair of axially-spaced end walls secured to the shell and that define shell ends, wherein one end wall is an apertured end wall that includes a plurality of ports that extend through the apertured end wall and that are in fluid communication with respective rows of apertures in the shell; and a stationary vacuum manifold in surface contact with the apertured end wall, the manifold having at least one elongated slot facing the apertured end wall for applying vacuum to selected groups of adjacent rows of apertures in the shell through respective end wall ports as the roll rotates relative to the manifold to provide a circumferentially-moving vacuum zone on the roll peripheral surface, wherein the apertured end wall includes a first group of end wall ports disposed in a first arc to define an arc-shaped series of spaced ports that extend over a first arc length of the end wall, wherein the arc has a radius that diminishes progressively from a first radius at a first end wall port adjacent the shell to a second radius at a second end wall port positioned radially inwardly of and angularly spaced from the first end wall port at a predetermined angle relative to the axis of rotation of the roll, wherein the second radius is smaller than the first radius, wherein a first group of ports are adjacent to each other and each port is at a different radius relative to the roll axis, including a second group of ports that is angularly spaced from the first group of ports and in which second group the ports are disposed at the same radius relative to the roll axis, wherein the manifold includes a first slot defined by a unitary, arc-shaped opening having a radial extent that includes the radii of the first group of ports and the radii of the second group of ports.

9. A vacuum roll in accordance with claim 8, wherein the manifold includes a second slot that extends across a portion of the vacuum roll end wall for selective communication with adjacent ports in the roll end wall to provide a moving vacuum zone that moves relative to the roll peripheral surface as the roll rotates.

10. A vacuum roll in accordance with claim 9, wherein the manifold includes a third slot that has a radius that corresponds with the radius of the second group of ports for communication therewith and that extends over a predetermined arc of the vacuum roll end wall.

11. A vacuum roll in accordance with claim 10, wherein the first slot and the second slot are interconnected.

12. A vacuum roll in accordance with claim 11, wherein the first and second slots are in communication with a first source of vacuum.

13. A vacuum roll in accordance with claim 12, wherein the third slot is in communication with a second source of vacuum, and wherein the second source of vacuum provides a higher vacuum than does the first source of vacuum.

14. A vacuum roll in accordance with claim 10, wherein the end wall ports and the manifold slot intersect at different radial positions relative to the roll axis as the roll rotates relative to the manifold.

* * * * *